United States Patent
Murton et al.

(10) Patent No.: US 6,999,470 B2
(45) Date of Patent: Feb. 14, 2006

(54) METHODS AND APPARATUS FOR TRANSMITTING SYNCHRONOUS DATA

(75) Inventors: Chris Murton, Chelmsford (GB); David M Goodman, St Albans (GB)

(73) Assignee: Nortel Networks Limited, St. Laurent (CA)

( * ) Notice: Subject to any disclaimer, the term of this patent is extended or adjusted under 35 U.S.C. 154(b) by 832 days.

(21) Appl. No.: 09/894,612

(22) Filed: Jun. 28, 2001

(65) Prior Publication Data

US 2003/0007519 A1    Jan. 9, 2003

(51) Int. Cl.
*H04J 3/16* (2006.01)
*H04J 3/04* (2006.01)
*H04L 12/28* (2006.01)

(52) U.S. Cl. ............... 370/466; 370/395.51; 370/535

(58) Field of Classification Search ............... 370/466, 370/395.51, 535
See application file for complete search history.

(56) References Cited

U.S. PATENT DOCUMENTS

| | | | |
|---|---|---|---|
| 6,477,178 B1 * | 11/2002 | Wakim et al. ............... | 370/466 |
| 6,584,118 B1 * | 6/2003 | Russell et al. ............... | 370/466 |
| 6,731,656 B1 * | 5/2004 | Slater et al. ............... | 370/536 |
| 2002/0001308 A1 | 1/2002 | Heuer | |
| 2003/0108069 A1 * | 6/2003 | Yamada ............... | 370/535 |
| 2003/0152079 A1 * | 8/2003 | Loeffler et al. ............... | 370/392 |
| 2004/0001519 A1 * | 1/2004 | Fisher et al. ............... | 370/535 |

FOREIGN PATENT DOCUMENTS

| EP | 1 091 513 A2 | 4/2001 |
|---|---|---|
| EP | 1 158 710 A1 | 11/2001 |
| WO | WO 9950986 | 10/1999 |

OTHER PUBLICATIONS

EP 1 158 710 A1 has a US Equivalent 2002/0001308 A1.

* cited by examiner

*Primary Examiner*—Ricky Ngo
*Assistant Examiner*—Feben Haile
(74) *Attorney, Agent, or Firm*—Barnes & ThornburgLLP

(57) ABSTRACT

In order to allow geographically separate SONET/SDH networks to be interconnected transparently without changes in clock content, payload and overhead, it has conventionally necessary to use dark fiber. For relatively low bandwidth operators this is prohibitively expensive. The present invention proposes a scheme using a mapping and virtual concatenation scheme to allow SONET/SDH to be carried in a bandwidth efficient manner over a SONET/SDH link whilst maintaining clock integrity.

14 Claims, 2 Drawing Sheets

US 6,999,470 B2

METHODS AND APPARATUS FOR TRANSMITTING SYNCHRONOUS DATA

FIELD OF THE INVENTION

This invention relates to the transmission of data over synchronous data networks such as synchronous optical network (SONET) and synchronous digital hierarchy (SDH) networks.

BACKGROUND OF THE INVENTION

SONET/SDH networks have since their introduction in the early 1990s achieved widespread acceptance and widespread usage. The networks transmit data by encoding data into well defined frame structures and then transmitting the data in the frame in a predetermined serial fashion.

The introduction of the SONET/SDH standards allowed network operators to assume a reasonable degree of interoperability between different vendors and thus the standards are used almost exclusively for all fibre-based broadband networks. However, not unexpectedly, a medium sized operator may wish to operate a network based on the SONET or SDH standards with several geographically dispersed networks. For example, an operator may have a network covering a city which it wishes to interconnect with a similar network covering a distant second city, For such an operator, the provisioning of a dedicated SONET or SDH fibre link between the two cities may be prohibitively expensive and/or not justifiable in terms of potential bandwidth usage. A typical reaction to this problem is to take the traditional business model of a "leased line". In this business model, the medium sized operator approaches a third party "carrier" to buy bandwidth on a fibre link which already exists between the two cities. In principal, this approach should be effective. However, a careful analysis shows that there are significant drawbacks with the prior art implementations of such a "leased line" approach.

What is desired is that the interconnection between the networks is entirely transparent so that it appears as if the SONET/SDH network elements in the two regions are directly connected over fibre.

Unfortunately, present solutions do not economically meet this need.

The first option to interconnect the two regional networks is to use so-called "dark fibre". This is simply a dedicated fibre which is leased in its entirety from the carrier. This provides the idealised solution but is as mentioned above, likely to be prohibitively expensive depending on the length of the fibre and the likely bandwidth utilisation.

In view of this, other prior art solutions have been proposed which attempt to carry an existing SONET/SDH data stream within a carrier's SONET/SDH network.

A first such solution is to use a digital wrapper on a dense wavelength division multiplexed (DWDM) wavelength on the fibre. However, there are many digital wrapper schemes; both proprietary and standard (as defined in ITU-TG.709). The schemes add a new non-SONET wrapper to the clients signal for use with DWDM systems. A significant problem with this approach is that the digital wrapper does not include a multiplexing scheme which means that the carrier cannot switch or cross-connect the signal electrically. Therefore the carrier must provision a new layer of wavelength or photonic switching to allow the signal to be routed through the carrier's network. This makes this solution expensive.

The second such solution is to carry the SONET/SDH payload in the carriers payload and to remap the operator's overhead to a different position in the carrier's overhead. It will be noted, that this is not fully transparent since it does not allow for proprietary use of the SONET/SDH overhead by the client network operator. In practice this is a serious problem. Furthermore, pointer processing within the carrier network disrupts the client operators signal clock content. This means that the geographically separated networks cannot operate fully transparently with synchronised clocks.

A third such solution is to map the operator's signal into the carriers SONET/SDH signal using real (or contiguous) concatenation. However, real concatenation is designed primarily to allow the carrying of high bandwidth signals (higher than the standard predefined SDH/SONET structures) using SONET/SDH. It will be noted that the present need is to carry a signal in one SONET/SDH structure using another SONET/SDH structure. Thus the requirement to solve this problem is to fit one structure inside another identically-sized structure and yet retain additional data such as the original overhead data. Thus using real concatenation using the standard concatenation sizes typically wastes at least nearly half the bandwidth of the real concatenated structure since to maintain all the desired information it is necessary to choose a real concatenated structure which is next largest in size than the operators structure which is to be carried by the carriers structure.

In addition to this massive over-provisioning resulting in large quantities of bandwidth being purchased from the carrier but remaining unused, real concatenation requires pointer processing to be carried out which affects the error count maintained in the overhead which in turn means that the process is not fully transparent.

Thus none of the prior art solutions (other than the prohibitively expensive dark fibre option) are able to carry the client operator signal transparently in the sense that the overhead payload and clock content remain entirely unaltered on receipt at the operators second regional network.

With this technique the client operator can build a SONET/SDH network without having to build its own entire transport network, by using facilities leased from a carrier. Such a facility then permits the proprietary use of SONET/SDH overhead, separation between the carrier and client network operators clock domains, separation of the OAM data communications (SONET/SDH DCN) domains and reduced inter-operability requirements.

SUMMARY OF THE INVENTION

In a first aspect, the invention provides a method of transmitting data in a first synchronous data format over a network operating using a second synchronous data format which is not clock-synchronised with the first data format comprising mapping data in the first format into a predetermined synchronous container format which preserves the content and location of the payload and overhead portions of the first data format, virtually concatenating the data in the predetermined synchronous container format to form a plurality of virtually concatenated payloads for transmission using the second synchronous data format, transmitting the virtually concatenated data over the network using the second synchronous data format, receiving the virtually concatenated data, combining the virtually concatenated data to retrieve the data in the predetermined synchronous container format, and performing an inverse mapping to reconstruct the data in the first format.

In this way, the mapping provides for transparency of data transmission over the carriers network using the second synchronous data format, and virtual concatenation ensures that the mapped signal is carried in a bandwidth efficient manner over the carrier's network. Effectively, therefore, the operators signal is carried in a pipe within the carriers SONET/SDH configured fibre link.

With this technique the client operator can build a SONET/SDH network without having to build its own entire transport network, by using facilities leased from a carrier. Such a facility then permits the proprietary use of SONET/SDH overhead, separation between the carrier and client network operators clock domains, separation of the OAM data communications (SONET/SDH DCN) domains and reduced inter-operability requirements.

It will be noted that the first and second synchronous data formats may both be SDH or both be SONET or may be one of each. Thus the transmission is genuinely transparent not even requiring the first and second data formats to be conformed to the same synchronous data standard.

According to a second aspect of the invention, there is provided a network element for a synchronous digital network comprising a data input arranged to receive synchronous data, a mapper arranged to map synchronous data received at the data input into a predetermined alternative synchronous data format without losing the overhead information contained in the synchronous data, and an inverse multiplexer arranged to virtually concatenate data received from the mapper in the alternative synchronous data format.

Thus, this network element is able to prepare data ready for sending over the carrier's link.

According to a third aspect there is provided a network element for a synchronous digital network comprising a data input arranged to receive synchronous data, a multiplexer arranged to combine virtually concatenated payloads contained in synchronous data received at the data input, and an inverse mapper arranged to inverse-map the combined payloads produced by the multiplexer into a predetermined alternative synchronous data format in which the payload data contained in the original mapping is preserved.

This network element typically receives data prepared by the network element according to the second aspect of the invention above.

In a further aspect the invention provides a synchronous data signal comprising a set of virtually concatenated payloads spread over a plurality of synchronous frames of a first format, each set of virtually concatenated payloads representing a synchronous frame of a second format and the synchronous frame of the second format containing a mapping of a synchronous frame of a third format, the mapping between the second and third formats being arranged to preserve the content and arrangement of the overhead and payload data originally contained in the synchronous frame of the third format.

This type of signal is unique in the SONET/SDH field. In the past, it has been possible to butt SONET/SDH networks together but not to carry SONET/SDH signals transparently within other SONET/SDH signals. It will be appreciated, that the butting of SONET/SDH networks requires pointer processing at the very least in order to deal with jitter and clock phase and possibly frequency differences between the two synchronous networks. This makes it impossible to have fully transparent connections between networks. Thus the signal according to this aspect requires only that the nodes or networks elements at each end of the "pipe" through the carrier network are able to perform the multiplexing, inverse multiplexing, mapping and inverse mapping functions. The network between these networks elements may operate on the SONET/SDH signal in an entirely conventional manner without affecting the transparency or the transmission between the terminating network elements.

Other aspects and features of the present invention will become apparent to those ordinarily skilled in the art upon the review of the following description of specific embodiments of the invention in conjunction with the accompanying figures.

DESCRIPTION OF THE PREFERRED EMBODIMENT

Figure 1:
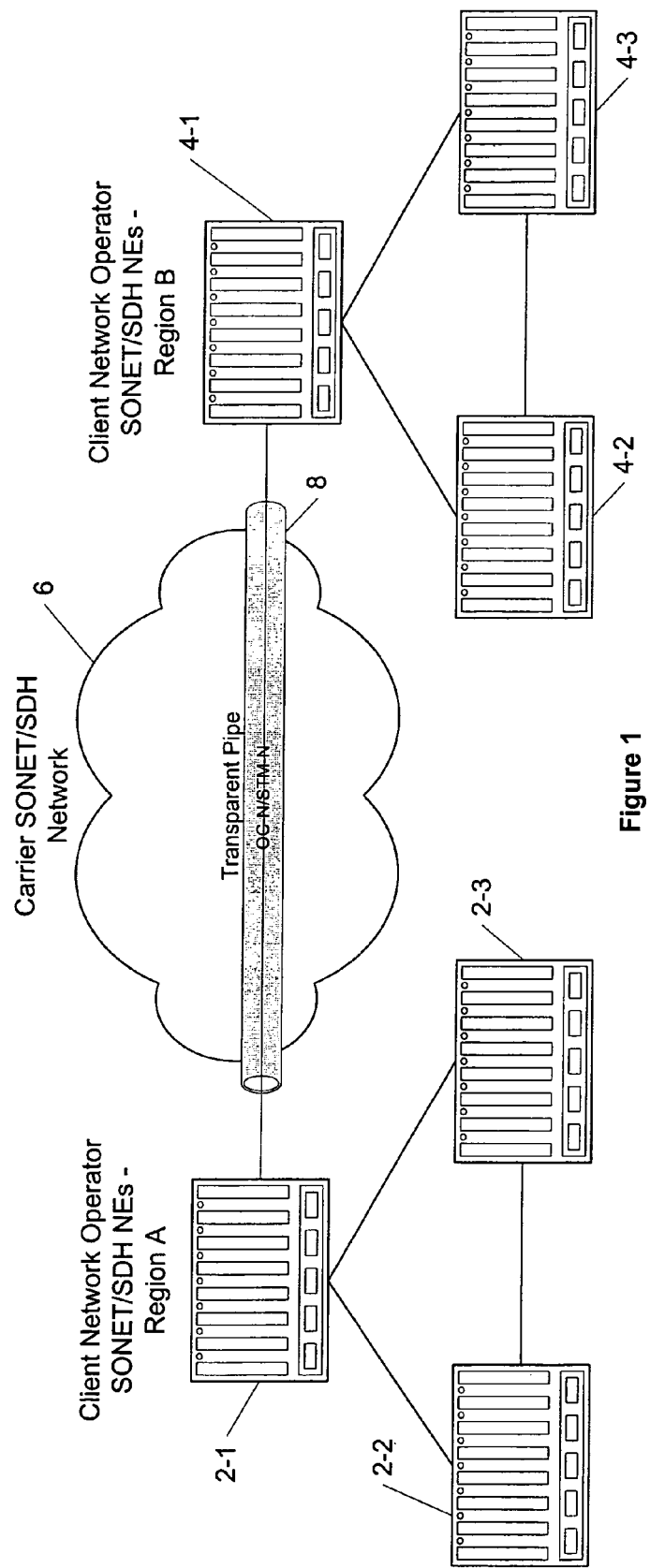
FIG. 1 is a schematic block diagram of two regional SONET/SDH networks interconnected by a carrier SONET/SDH network.

With reference to FIG. 1, a client network operator has a plurality of network elements 2-1, 2-2 and 2-3 forming a SONET/SDH network. The same operator has a second SONET/SDH network, formed by a plurality of network elements 4-1, 4-2 and 4-3 located at a separate geographically distant site from Region A. The network operator wishes to interconnect the region A and region B networks and thus enters an agreement with a carrier to interconnect the two networks over the carrier's SONET/SDH network 6.

The signals between the region A and region B networks are carried transparently through the carriers network 6 in what is commonly visualised and termed as a pipe 8. Thus data being transferred through the pipe is transferred with the payload, clock content and overhead unaltered. This allows the region A and region B networks to have clock synchronisation and to operate as if directly connected over dark fibre. However, since the client network operator does not need the full capacity of a dedicated fibre, the cost of the link through the network 6 is significantly lower than that of dark fibre.

It will be appreciated, of course, that if the client network operator is sufficiently large that it can use the full bandwidth of a dedicated fibre, then the dark fibre option may in that particular instance be economic.

Figure 2:
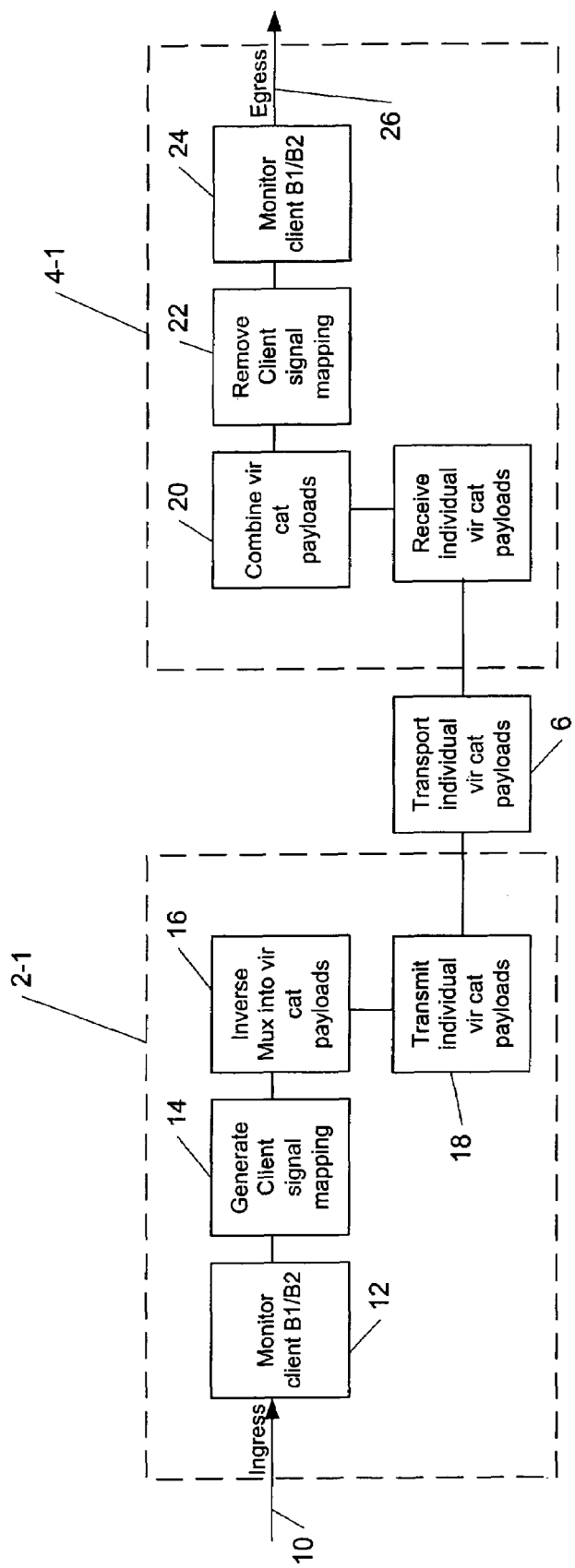
FIG. 2 is a block diagram showing the functional steps involved in sending and receiving data over the carrier SONE/SDH network.

With reference to FIG. 2, the signals in the region A network are processed before being transmitted to the region B network and vice versa.

The processing may be carried out in a dedicated network element or may form an integral part of an existing element. For the sake of this explanation, it is assumed that network element 2-1 in operator region A carries out the pre-processing steps before transmission, and that network element 4-1 in region B carries out the post-processing steps after reception. It will be appreciated that in practice the data communications are likely to be bi-directional and that therefore in effect there will be two pipes in the network 6 and the network elements 2-1 and 4-1 will carry out both the pre and post-processing functions. These functions may also be distributed to other network elements within the region A and region B networks.

Turning now to FIG. 2, synchronous data is received from elsewhere on the region A network in the SONET or SDH format at an ingress 10. Preferably, the B1 and B2 party codes (and their equivalent in SONET) are monitored at the ingress (step 12). In the next step (14), the SONET/SDH signal is mapped to another SONET/SDH frame structure in a way which preserves the payload, overhead and clock content of the original signal. A suitable mapping is disclosed in co-pending co-assigned U.S. patent application Ser. No. 09/349,087 filed on Jul. 8, 1999. The content of this application has also been published as European Patent Application No. 00305782.5; published on Jan. 10, 2001. The disclosure of these documents is incorporated herein by reference.

In step 16, the mapped signal is inverse multiplexed to form virtually concatenated payloads. This allows the mapped structure to fit more efficiently into the standard sized payloads of the SONET/SDH signals used within the pipe in the carrier network 6.

Standards of virtual concatenation are set out in the following standards documents:—

ITU-T G.803; "Architecture of transport networks based on the synchronous digital hierarchy (SDH)". ITU-T G.707; "Network Node Interface for the Synchronous Digital Hierarchy (SDH)", ITU-T G.783; "Characteristics of Synchronous Digital Hierarchy (SDH) Equipment Functional Blocks", ANSI T1.105; "Synchronous Optical Network (SONET) Basic Description including Multiplex Structure, Rates and Formats", ANSI T1.105.02; "Synchronous Optical Network (SONET)—Payload Mappings", and ETSI EN 300 417-9-1; "Transmission and Multiplexing (™) Generic requirements of transport functionality of equipment Part 9: Synchronous Digital Hierarchy (SDH) concatenated path layer functions. Subpart 1: Requirements".

The general principle is to divide the incoming signal into a plurality of virtual containers (in SDH terminology) and to include in the overhead of these virtual containers information concerning the identity of the original frame structure and also the sequence order of the containers within the original structure. This data may for example be located in the high order virtual container path trace byte (J1) or its equivalent in SONET. These labelled virtual containers may then be distributed in the normal SDH payload and switched through conventional switches.

At the receiving end, the receiving network element needs to understand the virtual concatenation technique used and may then buffer the virtual containers as they are received, realign them and combine them into the original frame structure. This technique allows fine resolution adjustment of bandwidth using standard SDH/SONET structures (which, it will be appreciated, have relatively coarse resolution of bandwidth). Examples of the bandwidths available using virtual concatenation are given in the table below:—

| Client signal | Carrier payload | Percentage fill |
| --- | --- | --- |
| OC-192 (9953280 kbit/s) | STS-12c-17v (10183680 kbit/s) | 98% |
| OC-48 (2488320 kbit/s) | STS-3c-17v (2545920 kbit/s) | 98% |
| OC-12 (622080 kbit/s) | STS-1-13v (643968 kbit/s) | 97% |
| OC-3 (155520 kbit/s) | STS-1-4v (198144 kbit/s) | 78% |
| STM-64 (9953280 kbit/s) | VC-4-4c-17v (10183680 kbit/s) | 98% |
| STM-16 (2485320 kbit/s) | VC-4-17v (2545920 kbit/s) | 98% |
| STM-4 (622080 kbit/s) | VC-3-13v (636480 kbit/s) | 98% |
| STM-1 (155520 kbit/s) | VC-3-4v (195840 kbit/s) | 79% |

Thus in the present invention, the combination of a mapping in order to preserve the integrity of the signalling including the clock content of the payload, followed by virtual concatenation in order to arrive at efficient bandwidth usage, provides the desired result of transparent carrying of SONET/SDH signals within a pipe inside a SONET/SDH connection without excessive over provision and bandwidth wastage.

With reference again to FIG. 2, the virtually concatenated payloads are transmitted (step 18) over the carriers networks 6 and are then received in a network element in the region B network (in this example, network element 4-1).

On receipt, the virtually concatenated payloads are combined (step 20) and inversed mapped (step 22) to retrieve the original data structure. The client signal B1/B2 parity signals are monitored (step 24) and then the reconstructed signal is output via the egress 26. Thus the signal at the ingress 10 and the signal at the egress 26 should be identical. These steps may be carried out in accordance with the teaching of co-pending co-assigned U.S. patent application Ser. No. 09/349,087.

It will be appreciated that many different mapping protocols may be used, the essential requirement being that the signal is mapped transparently in the sense that the payload, clock content and overhead are retained within the mapping and can be extracted using an inverse mapping.

It will be appreciated that the term "frame" relates herein to a SONET/SDH frame.

It will be noted that a significant advantage of the invention is that by providing a transport link between SONET/SDH networks using the virtual concatenation and mapping schemes described above, it is not necessary to provide special equipment to connect geographically separated network segments using a transparent pipe.

The invention claimed is:

1. A method of transmitting data in a first synchronous data format over a network operating using a second synchronous data format which is not clock-synchronised with the first data format comprising:
   (a) mapping data in the first format into a predetermined synchronous container format which preserves the content and location of the payload overhead portions and clock content of the first data format,
   (b) virtually concatenating the data in the predetermined synchronous container format to form a plurality of virtually concatenated payloads for transmission using the second synchronous data format,
   (c) transmitting the virtually concatenated data over the network using the second synchronous data format,
   (d) receiving the virtually concatenated data,
   (e) combining the virtually concatenated data to retrieve the data in the predetermined synchronous container format, and
   (f) performing an inverse mapping to reconstruct the data in the first format.

2. A method according to claim 1, wherein the first synchronous data format is a SONET synchronous transport module (STS) frame, wherein the predetermined synchronous container format is a SDH contiguously concatenated container, and wherein the virtually concatenated data is transmitted as a plurality of a SDH virtually concatenated payloads.

3. A method according to claim 1, wherein the first synchronous data format is a SDH synchronous transport signal (STM) frame, wherein the predetermined synchronous container format is a SONET contiguously concatenated container, and wherein the virtually concatenated data is transmitted as a plurality of SONET virtually concatenated payloads.

4. A method according to claim 1, wherein the predetermined synchronous container format is clock-synchronised with the second synchronous data format.

5. A network element for a synchronous digital network comprising;
   (a) a data input arranged to receive synchronous data,
   (b) a mapper arranged to map synchronous data received at the data input into a predetermined alternative synchronous data format without losing the overhead information contained in the synchronous data and preserving a clock content of the synchronous data, and
   (c) an inverse multiplexer arranged to virtually concatenate the synchronous data received from the mapper to form a plurality of virtually concatenated payloads for transmission using the alternative synchronous data format.

6. A network element according to claim 5, wherein the data input is arranged to receive data formatted according to the SDH standard and wherein the inverse multiplexer produces data formatted according to the SONET standard.

7. A network element according to claim 5, wherein the data input is arranged to receive data formatted according to the SONET standard and wherein the inverse multiplexer produces data formatted according to the SDH standard.

8. A network element for a synchronous digital network comprising:
   (a) a data input arranged to receive synchronous data, the synchronous data comprising a set of virtually concatenated payloads payloads spread over a plurality of synchronous frames of a first format, each set of virtually concatenated payloads representing a container,
   (b) a multiplexer arranged to reassemble the virtually concatenated payloads contained in the synchronous data received at the data input and reading a recorded identity of each payload, and
   (c) an inverse mapper arranged to inverse-map the combined payloads produced by the multiplexer into a predetermined alternative synchronous data format in which the payload data and a clock content contained in the original mapping is preserved.

9. A network element according to claim 8, wherein the data input is arranged to receive data formatted according to the SDH standard and wherein the inverse mapper produces data formatted according to the SONET standard.

10. A network element according to claim 8, wherein the data input is arranged to receive data formatted according to the SONET standard and wherein the inverse mapper produces data formatted according to the SDH standard.

11. A synchronous data signal comprising a set of virtually concatenated payloads spread over a plurality of synchronous frames of a first format, each set of virtually concatenated payloads representing a container the container including a mapping of a synchronous frame of a third format, the mapping between the container and synchronous frame of the third format being arranged to preserve the content and arrangement of the overhead payload data and a clock content originally contained in the synchronous frame of the third format.

12. A data signal according to claim 11, wherein the first format is an SDH format and wherein the third format is a SONET format.

13. A data signal according to claim 11, wherein the first format is a SONET format and wherein the third format is an SDH format.

14. A method of carrying synchronous digital data over a fibre-based telecommunications network, the encoding standard used for encoding of the synchronous digital data being selected from a group of encoding standards containing SONET and SDH, the method comprising:
   (a) receiving the synchronous data over time as a plurality of original frames,
   (b) mapping each original frame into the payload of a respective mapped frame constructed according to a standard selected from a group containing the SONET and SDH standards, the mapping being arranged to record the overhead and payload portions of each original frame,
   (c) virtually concatenating each mapped frame by dividing each mapped frame into a plurality of containers, recording the identity of each mapped frame in each of the containers, and distributing the containers over the payload areas of a plurality of synchronous frames,
   (d) transmitting the virtually concatenated mapped frames over the telecommunications network as a plurality of the synchronous frames,
   (e) receiving the synchronous frames,
   (f) reassembling the mapped frames by extracting the containers from the synchronous frames and reading the said recorded identity, and
   (g) performing an inverse mapping to retrieve the original frames including the payload and overhead portions, from the respective mapped frames,
whereby the synchronous data is carried over the telecommunications network without alteration of the payload, overhead portions or clock content of the original frames.

\* \* \* \* \*